UNITED STATES PATENT OFFICE.

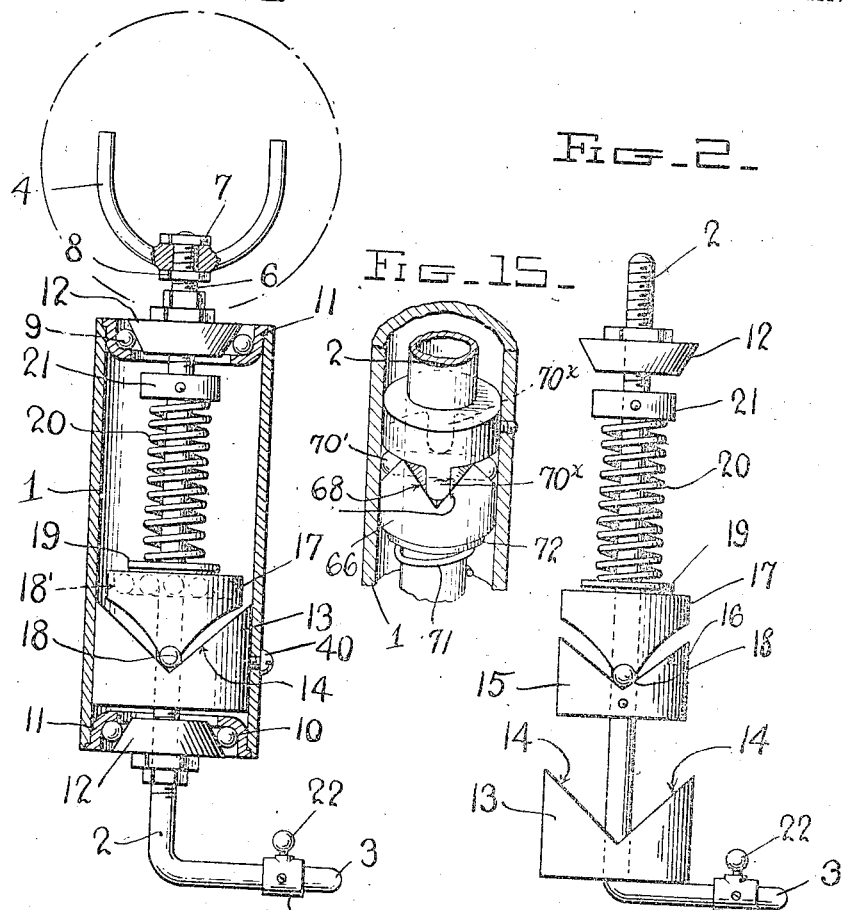
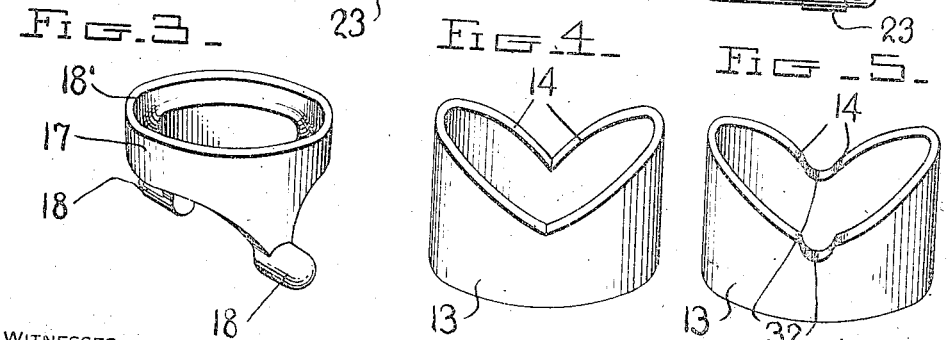

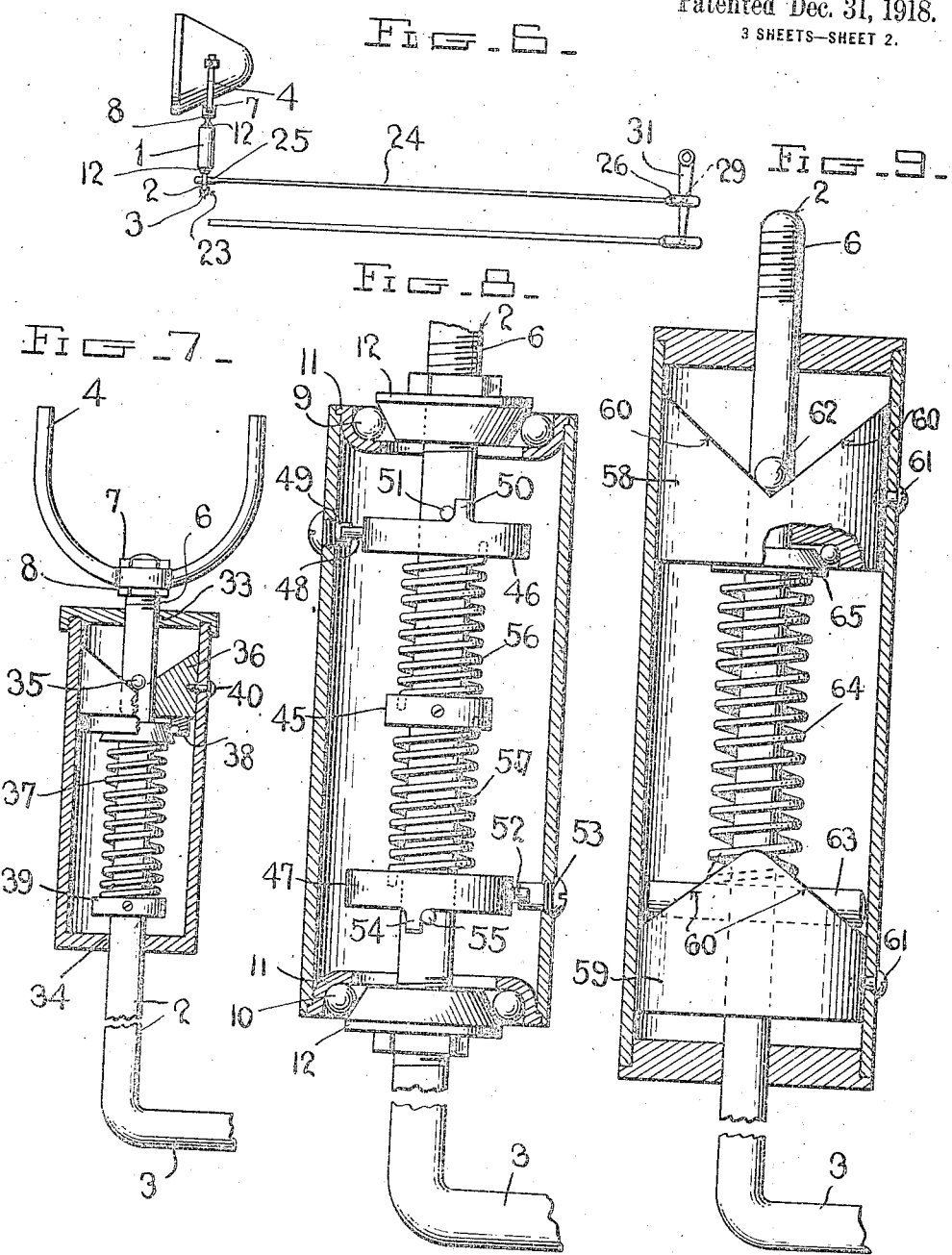

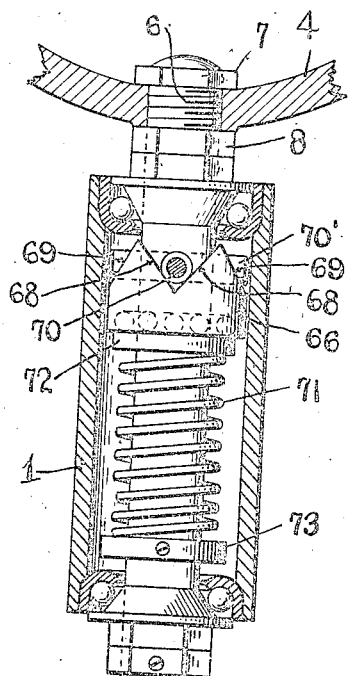
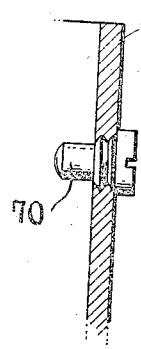
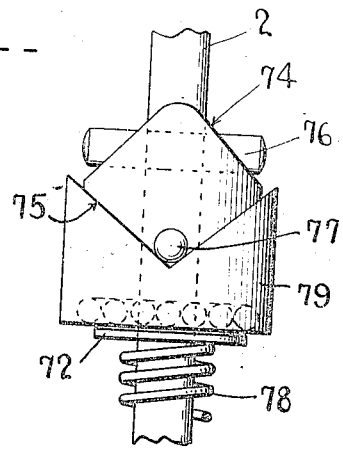
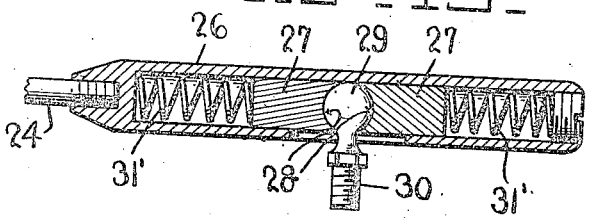
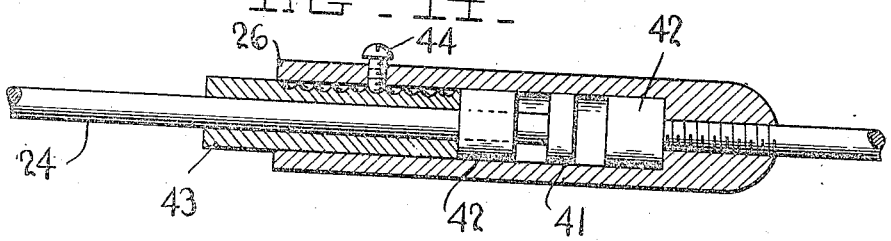

CAREY E. BUNKER, OF OREGON, MISSOURI.

HEAD-LAMP CONTROL.

1,289,107.  Specification of Letters Patent.  Patented Dec. 31, 1918.

Application filed October 12, 1917. Serial No. 196,234.

*To all whom it may concern:*

Be it known that I, CAREY E. BUNKER, a citizen of United States, residing at Oregon, in the county of Holt and State of Missouri, have invented new and useful Improvements in Head-Lamp Controls, of which the following is a specification.

This invention relates to headlamp controls and while specially designed with reference to the needs of operators of motor vehicles, the controlling mechanism hereinafter described and illustrated in the accompanying drawings, may be used in other connections which will suggest tl. mselves.

The object of the present invention is to produce simple and efficient means for controlling the headlamp or headlamps in such a manner that the rays of light therefrom may be directed at any angle required by the operator either manually or automatically, the connections being arranged to be controlled by an element of the steering mechanism so that the lamps will be turned in accordance with the angles assumed by the steering wheels of the vehicle.

One of the main objects of the present invention is to provide means whereby the lamps are rendered self-centering or adapted to be automatically returned to a straight ahead position when the steering mechanism of the vehicle is manipulated so as to direct the machine in a straight away course.

Another object of the invention is to so construct the lamp turning means that said means may be applied to vehicles already in use or the lamp turning mechanism may be supplied on new cars as part of the regular equipment.

Another object of the invention is to render the lamps steady and avoid objectionable oscillatory or vibratory movement of the lamps under all conditions, even when the vehicle is traveling over a rough road surface.

With the above and other objects in view, the invention consists in the novel construction, combination and arrangement of parts, herein fully described, illustrated and claimed.

In the accompanying drawing:—

Figure 1 is a vertical sectional view of a portion of the lamp turning mechanism, particularly illustrating the lamp centering means.

Fig. 2 is a view in elevation of the principal parts illustrated in Fig. 1.

Fig. 3 is a detail perspective view of the lamp centering member.

Fig. 4 is a detail view of one of the cam sleeves.

Fig. 5 shows a slight modification in the form of the cam sleeve.

Fig. 6 is a side elevation showing the complete lamp turning means.

Fig. 7 is a view similar to Fig. 1 showing the modified arrangement of the lamp centering means.

Figs. 8, 9 and 10 are views similar to Fig. 1 showing other modifications.

Fig. 11 is a fragmentary section through the tubular support of Fig. 10 in line with one of the projections.

Fig. 12 is a fragmentary elevation showing a modification of Fig. 10.

Fig. 13 is a longitudinal sectional view of one of the compensating devices.

Fig. 14 is a similar view showing a modified compensating device.

Fig. 15 is a fragmentary perspective view showing other centering means.

Referring to the drawings and particularly Figs. 1 to 6 inclusive, 1 designates a tubular support arranged vertically and having extended therethrough a lamp post or vertical shaft 2. The post 2 is provided at the lower end thereof with a lamp turning arm 3 and has at the upper end thereof the usual lamp carrying fork 4 between the arms of which the usual head lamp is mounted. The fork 4 may be fastened to the post 2 in any suitable or preferred way, as by threading the upper extremity of the post as shown at 6 and passing the same through a hole in the base of the fork, then securing the parts together by nuts 7 and 8 arranged above and below the fork 4 as shown in Fig. 1. In some instances, the fork 4, may be dispensed with and part 2 otherwise secured to the lamp.

The support 1 carries in the upper end thereof a ball bearing 9 and in the lower end thereof another ball bearing 10. The lamp post 2 passes through said bearings and is thereby enabled to be turned with a minimum amount of friction. Each of the bearings 9 and 10 preferably comprises a ball cup 11 securely fixed within the tubular support 1, and a cone 12, the balls being arranged between the ball race or cup 11 and the cone 12 which is adjustable to take up wear. Mounted within the lower portion of the support 1 is a non-rotary cam sleeve 13 having the reversely inclined cam surfaces 14 the purpose of which will presently appear. Normally lying within the sleeve 13 is another cam sleeve 15 having reversely inclined cam surfaces 16, the same as the cam surfaces 14 of the sleeve 13. The sleeve 15 is rotatable, being fastened to the lamp post 2 so as to turn therewith. Mounted loosely on the shaft or post 2, above the sleeves 13 and 15, is a lamp centering member 17 having oppositely extending projections 18 which may consist simply of pins or trunnions, or which may embody rollers, as may be preferred. Whether they consist merely of pins or pins and rollers, the parts 18 will hereinafter be referred to as projections. These projections coöperate with the cam surfaces 14 and 16 of the sleeves 13 and 15 to press the lamp centering member 17 in an upward direction in Figs. 1 and 2. The member 17 contains a ball race 18' containing balls which support a cone 19 slidable on the post 2. A compression spring 20 is interposed between the cone 19 and a fixed collar 21 on the post 2. The spring 20 resists the upward movement of the lamp centering member 17 and by its expansive movement acts to force the member 17 downwardly when the steering mechanism of the vehicle is returned to its normal straight ahead position, thereby forcing the projections 18 to the lowermost points of the cam surface 14 in which position the lamp will be directing its rays in the straight ahead path.

The arm 3 is provided with a ball 22 which may either be formed integrally with said arm or carried by a sleeve 23 embracing the arm 3 and said sleeve may be adjustable longitudinally of the arm 3 if so desired. An operating rod 24 is connected to the arm 3, being provided at its forward end with a socket member 25 to coöperate with and receive the ball 22 and being provided at its rear end with a compensating device, best illustrated in Figs. 13 and 14, said device embodying a tubular socket member 26 containing a pair of bearing blocks 27 slidably mounted in the socket member and formed at their adjacent ends with concaved recesses 28 to engage a ball 29 on the outer end of a shank 30 having a threaded and fixed connection with the steering arm 31 of a motor vehicle. Behind the bearing blocks 27 there are weak compression springs 31' which serve to hold the blocks 27 in engagement with the ball 29.

The construction just referred to provides for a cushioning engagement and a limited amount of longitudinal movement of the rod 24 in relation to the steering arm 31. This prevents any possibility of a cramping action and serves to steady the head lamps by taking up lost motion at this point. As shown in Fig. 5 the cam surfaces 14 of the sleeve 13 may terminate in depressed notches 32 to more securely hold the projections 18 against movement from their lamp centering positions.

A simple embodiment of the invention is illustrated in Fig. 7 in which the support 1 is provided at the top and bottom ends thereof with plain bearings 33 and 34 for the post 2. A pin 35 inserted transversely through the post 2 forms the opposite projections corresponding with the projections 18 hereinabove described. In this case only a single non-rotary cam sleeve 36 is positioned within the support 1 for coöperation with the projections formed by the end portions of the pin 35. A compression spring 37 is interposed between a bearing member 38 loose on the post 2, and a fixed collar 39 on said post, the spring 37, in this instance, being arranged below the cam sleeve 36. As shown in Figs. 1 and 7, the non-rotary cam sleeve is held fixed by means of a binding screw 40.

Instead of employing the compensating device shown in Fig. 13, the simple form of said device illustrated in Fig. 14 may be used. In this instance I do away with the springs 31 and the bearing members 27 of Fig. 13 and provide a head 41 on the rear end of the rod 24, which head 41 is adapted to play back and forth between abutments 42 located within the socket member 26 and sufficiently far apart to admit of a necessary play of the head 41. The abutments 42 will preferably be formed of rubber or other resilient material and the distance between said abutments may be adjusted by means of a sleeve or bushing 43 movable longitudinally in the member 26 and held at any desired adjustment by means of a set screw 44.

Another embodiment of the invention is illustrated in Fig. 8, wherein, the post 2 has fast thereon a fixed collar 45 and loose collars 46 and 47 above and below the fixed collar 45. The collar 46 has a pin 48, which coöperates with a fixed stop 49 to limit the turning movement of the collar 46 in one direction. The collar 46 also has a stop 50 which coöperates with a pin 51 projecting from the post 2. Likewise the collar 47 has a pin 52 which coöperates with a fixed stop 53 on the support 1. The collar 47 also has a stop 54 which coöperates with a pin 55 projecting from the post 2. A torsion spring 56 encircles the post 2 and has one end connected to the fixed collar 45 and the other end connected to the loose collar 46. Another torsion spring 57 has one end connected to the fixed collar 45 and the other end connected to the loose collar 47. The springs 56 and 57 are so arranged that only one of said springs is called into action at a time. When the arm 3 is turned in one direction, it serves to place the tension on the spring 56, the other spring being idle, and when the arm 3 is turned in the other direction tension is placed upon the spring 57, while the spring 56 remains idle. The result is that by means of both springs, the lamp is automatically centered when the steering mechanism is returned to a straight ahead position.

Under the arrangement illustrated in Fig. 9, I employ two stationary or non-rotary cam sleeves 58 and 59. Each of said cam sleeves is provided with cam faces 60 corresponding with the cam surfaces 14 of Fig. 4 and for the same purpose. The sleeves 58 and 59 are however arranged a quarter turn apart and are secured in fixed relation to the support 1 by set screws 61. The post 2 is provided with two sets of projections 62 and 63 to coöperate with the cam surfaces 60 of the sleeves 58 and 59 and said projections 62 and 63 are set at 90° from each other, as are also the cam surfaces 60, thus giving a more even bearing and balance to the lamp centering means. The lamp centering spring 64, in this instance, is arranged between the upper and lower cam sleeves 58 and 59 and is interposed between the projections 63 and a loose collar 65 on the post 2 and bearing on the lower end of cam 58.

In Figs. 10 and 11, I have illustrated another form of the device, the same differing from the preceding figures by the use of a combined cam sleeve and lamp centering member 66 which is revoluble and movable up and down within the support 1 and is formed with reversely inclined cam surfaces 68, the function of which is the same as the cam surface 14 above referred to. The member 66 is also provided with other reversely inclined cam surfaces 69. In this case two projections 70 extend inwardly from and are connected to the support 1, said projections coöperating with the cam surfaces 68 and two other projections 70' on the post 2 coöperate with the cam surfaces 69. One set of cam surfaces are disposed at 90° from the other and one set of projections are disposed at 90° from the other set when the device is centered or at rest. In this instance, the lamp centering spring 71 is arranged below the member 66 and interposed between a bearing member 72 slidable on the post 2 and a fixed collar 73 on said post.

In Fig. 12, two sets of cam surfaces 74 and 75 are provided and designed to coöperate with two sets of projections 76 and 77 on the inside of the support 1, the operation being similar in all respects to that described in connection with Fig. 10. Here also the lamp centering spring 78 is arranged below the lamp centering member 79 which is provided with the cam surfaces 74 and 75 above referred to.

From the foregoing description taken in connection with the accompanying drawings it will now be seen that the lamps are adapted to automatically center themselves when the controlling connections thereof are relaxed. Furthermore the lamp will be held steady and prevented from the rapid oscillatory movement to which lamps are ordinarily subjected when a motor vehicle is traveling upon a rough road surface. While the lamps are perferably mounted for automatic operation, it will of course be apparent that manually controlled means may replace the automatic connections. No side or turning movement of the lamps can occur without placing an extra tension upon the lamp centering spring. The fundamental idea of the invention is, of course, to automatically return the lamps to a central or straight ahead position, this being done automatically when the lamp turning connections are released.

It will be observed that by reason of the construction described, the lamp turning mechanism may be readily applied to any machine now in use or may be supplied on new cars as a part of the regular equipment.

The rod 2 may be tubular as shown in Fig. 10 to accommodate the lamp wiring which later may emerge at any suitable point below the sleeve 1. Instead of having the lugs 70 and 77 arranged as shown in Figs. 10 and 12, a sleeve with two lugs 70' and 70ˣ corresponding to the lugs 70 or 77 may be used to perform the same service, as shown in Fig. 15, said sleeve being held in position by a set screw or any other suitable means.

I claim:—

1. In headlamp control, the combination of a support, a substantially vertical lamp post extending through said support, bearings for said post carried by said support, a lamp turning arm extending from said post, a sleeve surrounding said post within said support and embodying reversely inclined cam surfaces which converge toward each other, a spring pressed lamp centering member, projections extending from said lamp post and coöperating with said cam surfaces, other projections from said support coöperating with the other cam surfaces on said sleeve at right angles to the first named cam surfaces.

2. In headlamp control, the combination of a support, a lamp post extending therethrough in a substantially vertical direction, bearings for said post carried by said support, a lamp turning arm extending from said post, and lamp centering means comprising a sleeve surrounding said post and within said support and embodying reversely inclined cam surfaces which converge toward each other, projections extending from said post serving to coöperate with said cam surfaces, other projections extending inwardly from said support, and coöperating with other of said cam surfaces on said sleeve, being held in close engagement therewith by means of a spring tension between bearings under said cam and a fixed collar on said post.

3. In headlamp control, the combination of a support, a lamp post extending therethrough in a substantially vertical direction, bearings for said post carried by said support, a lamp turning arm extending from said post, lamp centering means, comprising a spring surrounding said post, within said support, cam surfaces disposed within said support and in fixed relation thereto, projections extending from said post and coöperating with said cam surfaces, said spring being tensioned between a fixed collar on said post and the underside of said cam, serving to center the lamps when the extra tension on said spring has been released.

In testimony whereof I affix my signature.

CAREY E. BUNKER.